June 12, 1928.  1,673,409
G. H. KELLEY
HEAT INTERCHANGE APPARATUS
Filed March 12, 1926
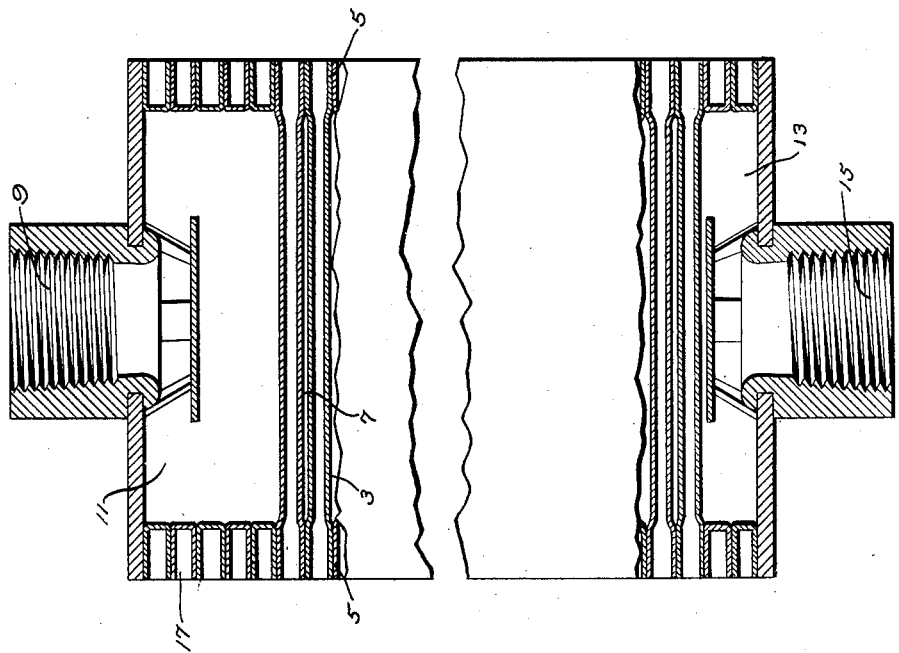
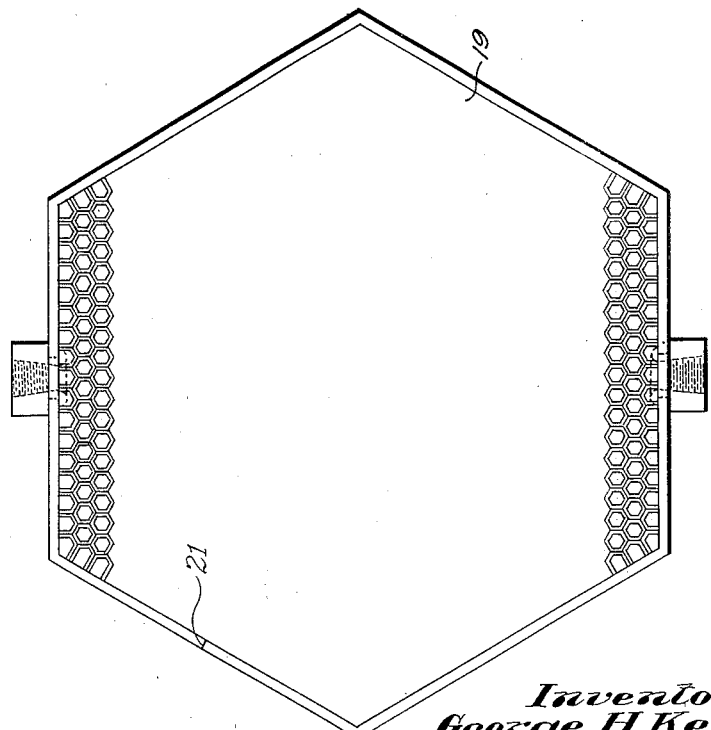
Inventor:
George H. Kelley
by Emery Booth Janney Varney
Attys.

Patented June 12, 1928.

1,673,409

UNITED STATES PATENT OFFICE.

GEORGE H. KELLEY, OF LOWELL, MASSACHUSETTS, ASSIGNOR, BY MESNE ASSIGNMENTS, TO WINCHESTER REPEATING ARMS COMPANY, OF NEW HAVEN, CONNECTICUT, A CORPORATION OF CONNECTICUT.

HEAT-INTERCHANGE APPARATUS.

Application filed March 12, 1926. Serial No. 94,176.

This invention relates to heat interchange apparatus of the type commonly comprising a fluid-containing chamber separated from a second fluid-containing chamber by a series of relatively thin contacting walls such as may be afforded by a cellular or tubular structure, with the opposite sides of which walls another fluid is caused to contact and effect a heat interchange with the fluid in contact with the opposite sides thereof.

Such a structure, by way of example, may consist of a tubular core forming a chamber traversed by a multiplicity of metallic tubes having thin walls through which tubes air or other fluid is passed, the opposite ends of the tubes being enlarged and so shaped as to permit of their assemblage as a unit with their ends fitting closely together, and the intermediate portions of the tubes being separated each from the other. The contacting faces of the ends of the tubes are united by suitable bonding metal to form tight joints and to provide closed front and rear walls for the chamber, the latter also being encased within side walls to form a closed compartment through which fluid either in gaseous or liquid form may be passed through suitable inlet and outlet openings.

One object of the present invention is to provide a fluid-receiving chamber in conjunction with the heat interchange chamber while permitting the structure to present exteriorly a substantially uniform cellular appearance.

The invention will be best understood by reference to the following description when taken in connection with the accompanying illustration of one specific embodiment thereof, while its scope will be more particularly pointed out in the appended claims.

In the drawings,—

Fig. 1 is a front elevation of a heat interchange apparatus embodying one form of the invention; and Fig. 2 is a central longitudinal section in elevation of the apparatus shown in Fig. 1.

Referring to the drawings and to the illustrative embodiment of the invention there shown, the apparatus comprises a cellular core having a heat interchange chamber traversed by a multiplicity of tubular conduits. The body of the chamber is prepared by assembling in the form of a core of any suitable shape, herein of hexagonal outline, groups of tubular members including a group of tubes 3, preferably thin walled and formed of copper, brass or other suitable material. The main body of each tube where it transects the heat interchange chamber is of reduced cross section which is preferably though not necessarily circular in shape, but at opposite ends it is enlarged to a non-circular, polygonal and herein hexagonally shaped head 5, the heads when grouped or assembled being in close fitting or contacting relation, while the intermediate portions of circular cross section are separated by narrow spaces 7 which communicate with each other to form a heat interchange chamber. These tubular members present through passages from end to end for the fluid, such, for example, as air, designed to have transferred to it heat from the fluid contained within the chamber, such, for example, as steam, the latter entering the chamber through the admission opening 9.

In apparatus of this type it is often required to have one or more spaces unobstructed by the transecting tubular conduits to serve as fluid-receiving chambers, there being herein shown two such unobstructed spaces, one 11 a chamber to receive the entering steam or other fluid, and the other 13 to receive the accumulated fluid, either in the form of vapor or condensed liquid, before its discharge through the discharge orifice 15.

In the present construction, such fluid-receiving chambers are formed within the core by providing thereat a second group of tubular members 17 at the front of the structure and a similar group at the rear of the structure, said members being of relatively short length and having closed inner ends. The tubular members 17 are also non-circular in cross section and arranged in closely fitting relation so that exteriorly they present the same appearance as the tubular conduit members, the core preserving in its entirety the cellular form and appearance. The tubular members 17, however, constitute blind tubes and leave the spaces 11 and 13 within the core unobstructed by the transecting walls of the fluid passages.

The several groups of tubes assembled in this fashion and maintained in close fitting relation are enclosed within suitable side walls, these being provided herein by a continuous metal band 19 which extends entirely around the tubular members and has the shape which it is desired to impart to the structure,—herein hexagonal.

The band 19 is preferably of a width coextensive at least with the length of the tubes so that when finished it acts as the permanent side walls of the heat interchange chamber. It overlies and contacts with the enlarged ends of the tubes 5 and the blind tubes 17 so as to provide a continuous wall of contact. The tubular heads, where they contact with the band, are so shaped in cross section as to provide a continuous wall of contact with the band, varying more or less from the hexagonal cross sectional shape.

The band 19 which thus extends around and unites the tubes into an integral structure has its ends butt welded or brazed at 21, or otherwise secured, so as to impart the desired strength to the structure. The structure thus formed merely of the several groups of tubes and the continuous band 19 is then completed by the single step of subjecting the opposite faces thereof to the action of a bonding alloy. The opposite faces of the core assembled within the band are first dipped in a bath of soldering flux, as, for example, one containing a zinc chloride base, the latter being allowed to penetrate to a suitable depth, preferably somewhat greater than that represented by the enlarged ends of the tubes. Both opposite faces of the structure are then immersed slightly in a bath of melted solder, which may be formed of any suitable bonding alloy. In the soldering process, however, both faces of the entire structure are thus dipped one after the other so that the contacting edges of the tubes are not only bonded and united to form fluid tight joints, but the band is united at its edges to the tubes on both the front and rear faces.

The completed structure presents a cellular appearance in front and rear composed of the tubular members firmly bound together by the encircling band 19, with the tensile strength of the band available both to hold the parts together and unite the side walls to the tubes, increasing its resistance to internal pressure and providing interiorly the heat interchange chamber transected by the tubular conduits and the liquid receiving chamber or chambers unobstructed by such transecting conduits.

While I have herein shown and described for purposes of illustration one specific embodiment of the invention, it is to be understood that the same may be varied within wide limits and that extensive deviations may be made therefrom and other applications be made thereof, without departing from the spirit of the invention.

I claim:

1. A heat interchange apparatus comprising a core having a heat interchange chamber formed by a group of tubular members extending through the chamber and having opposite enlarged ends arranged in closely fitting relation and bonded together to form front and rear walls of the chamber, and having also a fluid receiving chamber formed by a group of closed tubular members also arranged in close fitting relation and bonded together to form front and rear walls of said fluid receiving chamber, and a continuous band extending around the sides of said core and also bonded to said enlarged ends to form fluid tight joints thereat.

2. A heat interchange apparatus comprising a core having a heat interchange chamber formed by a group of tubular members extending through the chamber and having opposite enlarged ends arranged in closely fitting relation and bonded together to form front and rear walls of the chamber, and having also a fluid receiving chamber formed by a group of closed tubular members also arranged in closely fitting relation and bonded together to form front and rear walls of the fluid receiving chamber, and side walls closing the sides of said chambers.

3. A heat interchange apparatus having a heat interchange chamber and a fluid receiving chamber, said apparatus comprising a cellular core, the front and rear walls of which are composed of tubular members bonded together, the said members comprising one group having tubular conduits extending through the heat interchange chamber with opposite enlarged ends in closely fitting and bonded relation, and comprising also groups of members located on opposite sides of said core having closed inner ends and extending part way only into the core to leave an unobstructed space within the same to constitute said fluid receiving chamber, and side walls extending around the two groups of tubular members to unite the latter into an integral cellular structure.

4. A heat interchange apparatus having a heat interchange chamber and a fluid receiving chamber, said apparatus comprising a cellular core formed in part by a group of tubular members having enlarged, closely fitting ends, each with an intermediate portion of reduced cross section extending through the heat interchange chamber, and in part by tubular members having closed inner ends and extending part way only into said core but having externally exposed open ends in closely fitting relation and leaving an unobstructed space within the core to constitute said fluid receiving chamber.

5. A heat interchange apparatus having a cellular core, the front and rear walls of which are composed of a group of tubular members with enlarged united ends and intermediate portions of reduced cross section presenting fluid passages, the walls of which extend through the apparatus and are exposed to the fluid within, and a second group of tubular members comprising a plurality of blind tubes grouped together also having exteriorly exposed united ends similar in formation to the united ends of said first group of tubular members but extending part way only into said core and leaving a fluid space within unobstructed by the transecting walls of the fluid passages and means uniting said groups of tubular members into an integral cellular structure.

In testimony whereof, I have signed my name to this specification.

GEORGE H. KELLEY.